(12) United States Patent
Fürbach et al.

(10) Patent No.: US 6,807,198 B1
(45) Date of Patent: Oct. 19, 2004

(54) LASER DEVICE

(75) Inventors: Alexander Fürbach, Vienna (AT); Ferenc Krausz, Vösendorf (AT)

(73) Assignee: Femtolasers Produktions GmbH (AT)

( * ) Notice: Subject to any disclaimer, the term of this patent is extended or adjusted under 35 U.S.C. 154(b) by 0 days.

(21) Appl. No.: 10/030,463

(22) PCT Filed: Jun. 26, 2000

(86) PCT No.: PCT/AT00/00173
§ 371 (c)(1),
(2), (4) Date: Apr. 24, 2002

(87) PCT Pub. No.: WO01/05002
PCT Pub. Date: Jan. 18, 2001

(30) Foreign Application Priority Data

Jul. 7, 1999 (AT) .............................................. 1159/99

(51) Int. Cl.[7] .............................................. H01S 3/098
(52) U.S. Cl. ...................... 372/18; 372/27; 372/29.023; 372/30; 372/69; 372/92
(58) Field of Search .............................. 372/18, 27, 30, 372/29.023, 69, 92

(56) References Cited

U.S. PATENT DOCUMENTS

| | | | |
|---|---|---|---|
| 5,029,179 A | | 7/1991 | Harrison |
| 5,040,182 A | | 8/1991 | Spinelli et al. |
| 5,361,268 A | * | 11/1994 | Fossey et al. ................. 372/23 |
| 5,491,707 A | * | 2/1996 | Rieger et al. ................. 372/25 |
| 5,790,574 A | * | 8/1998 | Rieger et al. ................. 372/25 |
| 5,953,354 A | * | 9/1999 | Staver et al. ................. 372/18 |
| 6,031,854 A | * | 2/2000 | Ming .......................... 372/22 |
| 6,141,362 A | * | 10/2000 | Meyerhofer et al. .......... 372/30 |
| 6,263,004 B1 | * | 7/2001 | Arvidsson et al. ............ 372/11 |
| 6,327,282 B2 | * | 12/2001 | Hammons et al. ............. 372/22 |
| 6,393,035 B1 | * | 5/2002 | Weingarten et al. .......... 372/18 |
| 6,546,027 B1 | * | 4/2003 | Khaydarov .................... 372/10 |
| 2002/0085608 A1 | * | 7/2002 | Kopf et al. ................... 372/75 |

FOREIGN PATENT DOCUMENTS

| | | |
|---|---|---|
| AT | A1159/99-12 | 7/1999 |
| JP | 61036985 | 2/1986 |
| JP | 7142799 | 6/1995 |
| WO | 9810494 | 3/1998 |
| WO | 98/22995 | 5/1998 |

OTHER PUBLICATIONS

R. Szipocs, et al., "Chirped Multilayer Coatings For Broadband Dispersion Control in Femtosecond Lasers", *Optics Letters*, vol. 19, No. 3, Feb. 1, 1994, pp. 201–203.

B.P. Boczar, et al., "New Scheme For Ultrashort–Pulsed Nd/sup 3+/:YAG Laser Operation: A Branched Cavity, Internally Seeded Regenerative Amplifier", *Applied Optics*, vol. 22, No. 11, Jun. 1, 1983, pp. 1611–1613.

L. Turi, et al., "Diode–Pumped Nd:YLF All–In–One Laser", *Optics Letters*, vol. 20, No. 14, Jul. 15, 1995, pp. 1541–1543.

Andreas Stingl, et al., Generation of 11–fs pulses from a Ti:sapphire laser without the use of prisms, 1994, Optics Letters, vol. 19, No. 3, pp. 204–206.

* cited by examiner

*Primary Examiner*—Don Wong
*Assistant Examiner*—Delma R. Flores Ruiz
(74) *Attorney, Agent, or Firm*—Ostrolenk, Faber, Gerb & Soffen, LLP

(57) ABSTRACT

A Laser arrangement (1) comprising a pump unit (2) containing a pumped laser crystal (3), and means, such as a saturable absorber (15), for passive mode-locking, wherein two separate, alternatively switchable resonator arms (11, 12) are provided, one resonator arm (11) of which, which is active in a pulse forming phase (21), comprises the saturable absorber (15), whereas the other resonator arm (12), which is active in an amplifying phase (22), is free from components that introduce losses.

12 Claims, 2 Drawing Sheets

LASER DEVICE

Figure 1:
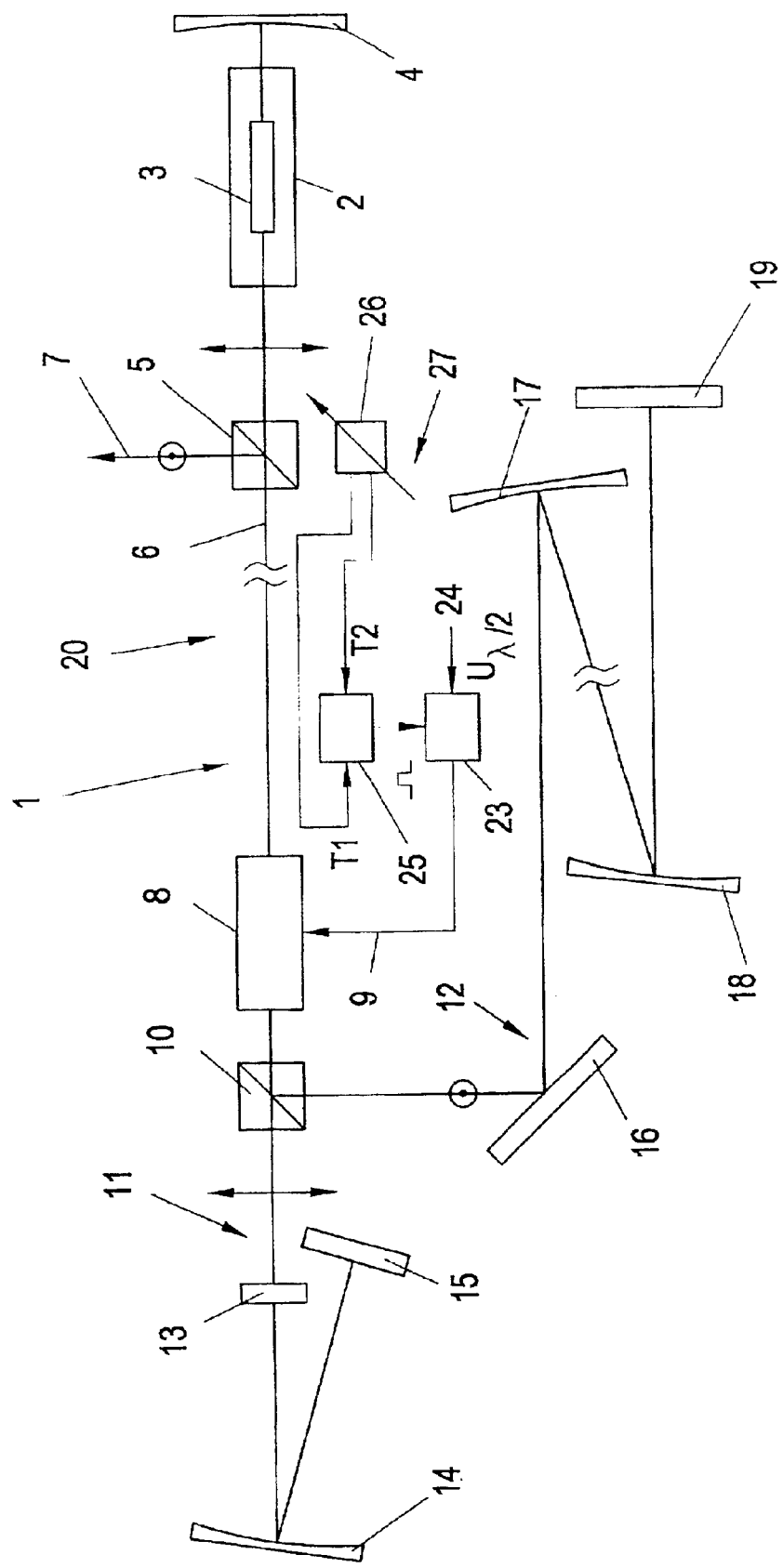

The invention relates to a laser arrangement comprising a pump unit containing a pumped laser crystal, and further comprising means for passive mode-locking.

Such laser arrangements are particularly provided as short pulse laser arrangements, wherein short laser pulses are generated with high energy in the mode-locked state. These short pulse laser arrangements are advantageously used for high-precision material processing or for scientific tasks. As regards the generation of short laser pulses, reference may be made, e.g., to the general statements in WO 98/10494 A as well as in A. Stingl et al.: Generation of 11-fs pulses from a Ti:sapphire laser without the use of prisms; Optics Letters Vol. 19, No. 3, 1 Feb. 1994, pp. 204–206.

The standard technique for generating short laser pulses with high energy is based on the technique of a laser oscillator and a laser amplifier. The laser oscillator generates a sequence of short laser pulses of low energy, e.g. with a repetition frequency in the range of some ten Mhz. From these oscillator pulses, pulses with a lower repetition frequency are selected and amplified in a regenerative or so-called multi-pass amplifier to give pulses of high energy. An all-in-one concept is preferably used, in which merely one laser is provided which is used both as osciliator and also as regenerative amplifier, by simply performing the pulse formation (at low energies) on the one hand, and the amplification (to high energies), on the other hand, at different times. Known laser arrangements of this type (cf. e.g. L. Turi, T. Juhasz: Diode-pumped Nd:YLF all-in-one laser; Optics Letters Vol. 20, No. 14, 15 Jul. 1995, pp. 1541–1543), comprising a laser both for the oscillator function and also for the amplifier function, use active mode-locking with an acousto-optic modulator. Since the active mode-locking is not very efficient, the minimum pulse duration obtainable is relatively long, and moreover, a complex electronic circuitry is required for the time control and stabilization, respectively, to achieve a reliable long-term operation.

On the other hand, in laser arrangements it is generally known—as results from the previously mentioned document WO 98/10494 A, to design a passive mode-locking, in particular also with a saturable absorber. Other possible ways for passive mode-locking are, e.g., the utilization of the Kerr effect (so-called Kerr lens mode-locking, KLM), the use of non-linear mirrors (non-linear mirror mode-locking, NLM), the application of a non-linear polarization rotation in optic crystals or cascaded non-linear processes of the second order.

It is now an object of the invention to provide a laser arrangement of the initially defined type which, when using a passive mode-locking, allows for an all-in-one construction of the laser, wherein the advantage is used that a passive mode-locking causes a much stronger amplitude modulation than an active mode-locking and stable short pulses in the pico- or femto-second range can be generated, i.e. with pulse durations near the possible lower limit value, which is given by the finite amplification bandwidth of the laser material used. Here, also the problem must be solved that passive mode-locking devices, such as saturable absorbers, on the other hand provide an upper limit to the raising of the energy, due to their low destruction threshold value, and moreover, with an excessive saturation of the absorber, also instabilities are caused. The invention now is based on the idea to distribute the resonator to two different sub-resonators active at different times, with the sub-resonators providing the different tasks, i.e. the pulse formation by using the passive mode-locking, on the one hand, with high resonator losses corresponding to the low power levels, and, on the other hand, the amplification to high pulse energies.

The inventive laser arrangement of the initially defined type therefore is characterized in that two separate, alternatively switchable resonator arms are provided, one of which, which is active in the one pulse forming phase, comprises the means for passive mode-locking, whereas the other resonator arm, which is active in an amplifying phase, is free from components that introduce losses. In the present laser arrangement, thus, different resonator parts are used at different times, wherein in the one phase, when the short laser pulses having a low energy are generated, the one resonator arm is active with the arrangement for passive mode-locking, with high resonator losses corresponding to the low power values prevailing; after the pulse formation, the resonator is switched over so that the other resonator arm becomes active, wherein the means for passive mode-locking is no longer present in the resonator, and an amplification to high pulse energies becomes possible with a view to the high resonator quality of the resonator now active.

Suitably, the polarization of the laser beam is utilized for switching, and accordingly, for a simple embodiment of the laser arrangement it may be provided that for switching between the two resonator arms, at least one polarization-sensitive beam divider as well as a polarization rotating means is provided. To this end, preferably a Pockels cell is used as the polarization rotating means; such a Pockels cell may be controlled electrically so as to rotate the polarization direction of the laser beam passing therethrough—by 90°. In combination with another appropriate polarization-sensitive beam divider, thus, the laser beam can be directed into the other resonator arm after this switching.

It is particularly advantageous if one polarization-sensitive beam divider each is arranged in the path of the laser beam on either side of the polarization rotating means. In this instance, the polarization-sensitive beam divider provided on the side of the polarization-rotating means facing away from the means for passive mode-locking may form a laser beam out-coupling element so as to couple out the amplified laser pulses.

As a means for passive mode-locking, preferably a saturable absorber is used, as is known per se.

The saturable absorber advantageously may be a per se known saturable semiconductor absorber.

Moreover, for a compact, efficient resonator embodiment it is also advantageous if the saturable absorber is an absorber mirror terminating the one resonator arm, which absorber mirror in particular is semiconductor-based.

To introduce the desired losses in the laser beam during the pulse forming phase, it is also suitable to provide a linear loss element, e.g. a $\lambda/4$ platelett, in the one resonator arm which is active in the pulse forming phase, which platelett provides for a high energy accumulation in the laser crystal.

For designing the laser arrangement as an all-in-one laser system, finally, it is also suitable if the pumping unit is a continuous wave diode pumping unit and, together with the polarization rotating means, forms a resonator part common to both resonator arms. Moreover, it is advantageous if the pumping unit is lamp-pumped or laser-pumped and, together with the polarization rotating means, forms a resonator part common to both resonator arms.

In the following, the invention will be explained in more detail by way of a preferred exemplary embodiment illustrated in the drawing to which, however, it shall not be restricted.

Figure 2:
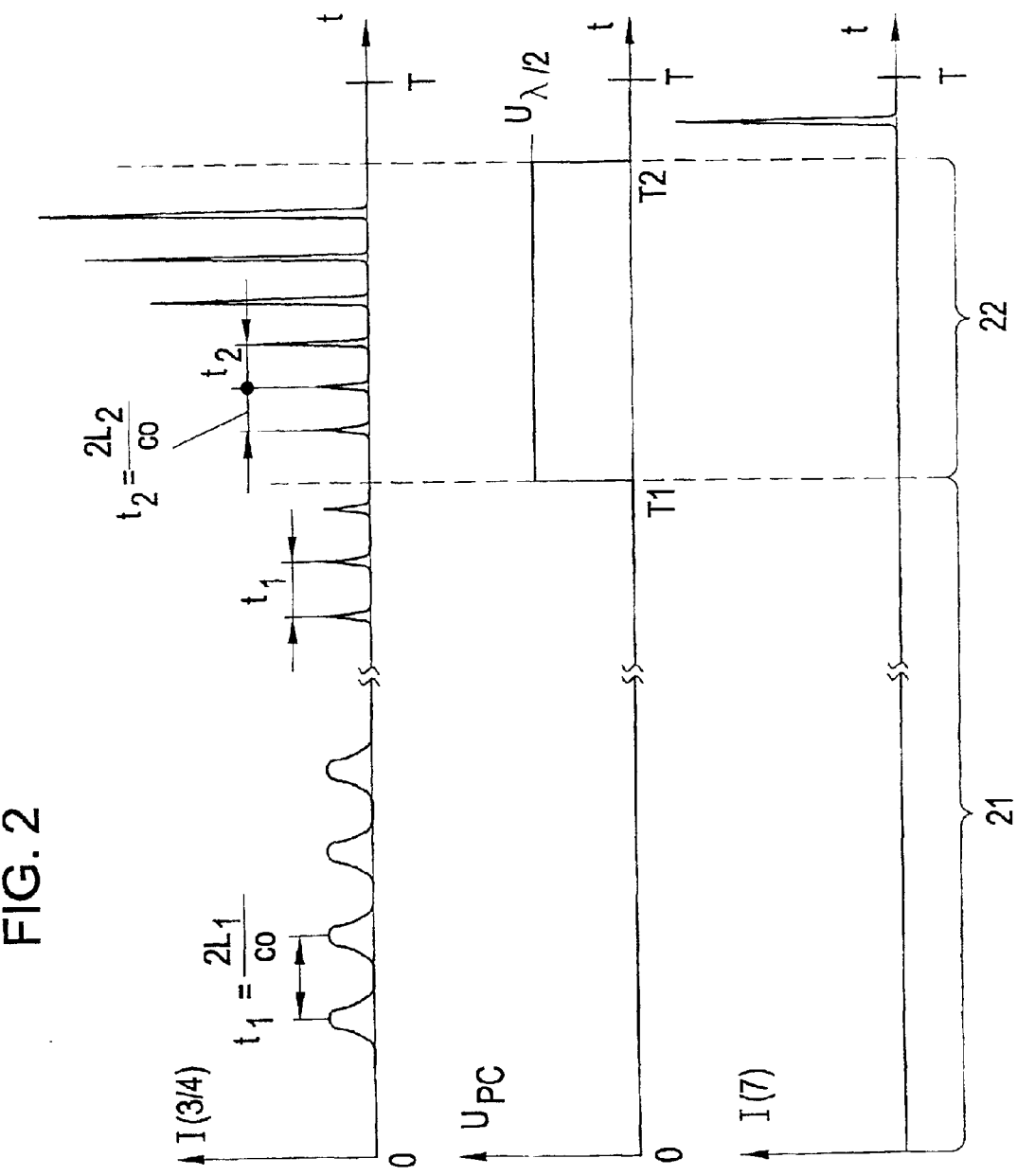

FIG. 1 shows a schematic short-pulse laser arrangement according to the all-in-one design; and FIG. 2 shows an associated diagram.

In the drawing, in FIG. 1 an all-in-one short pulse laser arrangement is illustrated and generally denoted by 1 which comprises a pump unit 2 that contains a—merely schematically indicated—diode-pumped laser crystal 3. On the one side of this pumping unit 2, a reonator end mirror 4 is provided.

On the other side of the pump unit 2, a polarization-sensitive beam divider 5 is provided which simultaneously forms an out-coupling element for the amplified laser beam 6, as is schematically indicated by the arrow 7. During its round trip in the indicated resonator, the laser beam 6 gets to a polarization rotating means in the form of a Pockels cell 8 which, as denoted at 9, can be electrically controlled in a manner known per se and therefore merely shortly explained in the following, so as to rotate the polarization of the laser beam 6 by 90°.

In the path of the laser beam 6, there follows a further polarization-sensitive beam divider 10 which, depending on the polarization of the laser beam 6, allows the laser beam 6 to pass therethrough.(i.e., in the one laser resonator arm 11) or reflects the same (i.e. in the other laser resonator arm 12). In FIG. 1, the polarization of the laser beam 6 in the one resonator arm 11 is schematically indicated by a double arrow and in the other resonator arm 12 by a dot in the circle, the double arrow indicating that the polarization direction is in the plane of drawing, whereas the dot in the circle for the other resonator arm 12 indicates that the polarization direction of the laser beam 6 is perpendicular to the plane of drawing.

In the one resonator arm 11, in the path of the laser beam 6 there follows a λ/4 platelett 13 which introduces the required losses in the laser beam 6, whereafter the laser beam 6 is reflected by a mirror 14 to a saturable semiconductor-absorber mirror 15 which is provided as means for passive mode-locking. Such saturable semiconductor absorber mirrors are known per se so that no further explanation is required.

In the other resonator arm 12, the laser beam 6 is guided via four mirrors 16 to 19 so as to obtain the required length of travel, wherein the mirrors 17 and 18 are spherical focussing mirrors, whereas mirrors 16 and 19 are highly reflecting plane mirrors.

As may be seen, the elements 4, 2, 3, 5, 8 thus together form a resonator part 20 which, depending on the polarization direction of the laser beam 6 at the beam divider 10, then either will be supplemented by the one resonator arm 11 or by the other resonator arm 12 so as to form the entire laser resonator. The one laser resonator having the length L1 thus is formed by the elements 4, 2, 3, 5, 8, 10, 13, 14 and 15, and it is responsible for the pulse build-up phase (pulse forming phase) 21 (cf. FIG. 2); the other resonator having the length L2, however, is formed by the elements 4, 2, 3, 5, 8, 10, 16, 17, 18 and 19 and is responsible for amplification (amplifying phase 22 in FIG. 2).

In the pulse forming phase 21 in which no voltage is applied to the Pockels cell 8, the one resonator arm 11, as mentioned, is effective. The two beam dividers 5 and 10 allow the laser beam 6 to pass therethrough, since the latter at this time is linearly polarized in the plane of the drawing, cf. the double arrows at the two beam dividers 5 and 10. The λ/4 platelett 13 is adjusted to introduce high losses into the system and thus to keep low the power level in the resonator 20-11 and to cause a high inversion in the laser crystal 3. Since the saturable absorber mirror 15 is located in the one resonator arm 11, the desired short laser pulses develop. This is shown in FIG. 2 in the upper diagram line, in which the pulse intensity I(3/4), measured at a site between the pump unit 2 with the laser crystal 3 and the end mirror 4, is drawn; as is apparent, the pulses having a distance $t_1 = 2L1/c_0$ (with $c_0$ 32 laser beam speed) progressively become shorter.

To switch over to the amplifying phase 22, a λ/2 voltage $U_{\lambda/2}$ given by the respective Pockels cell 8 is applied to the Pockels cell 8, at 9, by a per se common control electronic circuitry (cf. also the second line in FIG. 2 which shows the course of the voltage $U_{PC}$ at the Pockels cell 8 in dependence on the time t). This control must be effected at a time T1, at which the laser pulse which circulates in the resonator, is just on the right-hand side of the Pockels cell 8 according to the illustration in FIG. 1, i.e. in the region of the beam divider 5 or of the pump unit 2, respectively, or the end mirror 4, respectively. As a rule, a Pockels cell already contains a driver circuit in which such times can be adjusted. Thus, in FIG. 1 a rapid high voltage switch 23 is shown merely schematically, to which a high voltage $U_{\lambda/2}$ is supplied at 24, and which has an associated circuit 25 for generating an electrical pulse to switch the high voltage switch 23, or the Pockels cell 8, respectively, at the times T1 and T2, respectively. FIG. 1 moreover schematically shows an externally adjustable time control element 26 to thus indicate the adjustment of times T1, T2. Elements 23 to 26 thus form an electronic control unit which is indicated at 27 in FIG. 1, which control unit is provided for switching the laser beam via the Pockels cell 8.

If the laser pulse then reaches the Pockels cell 8, due to the driving of the latter at time T1 (cf. also FIG. 2), the polarization is rotated by 90° so that it will extend perpendicular to the plane of drawing. The laser pulse then will no longer be allowed by the beam divider 10 to pass to the one resonator arm 11 provided for the pulse forming phase 21, but it will be reflected to the other resonator arm 12, passing through the system comprising the mirrors 16 to 19 and finally being reflected by the beam divider 10 back to the Pockels cell 8—where it is again rotated in its polarization by 90°. Since in this other resonator arm 12 elements introducing losses are not contained, the energy of the laser pulses will be rapidly increased by any round trip, cf. also FIG. 2, first diagram line, graph of the pulse intensity I (3/4).

When the pulse energy has reached its saturation value, the Pockels cell 8 is switched off. This switching off is effected at a time T2 at which the laser pulse is at the left of the Pockels cell 8, i.e. in the other resonator arm 12 provided for the amplifying phase 22. If the laser beam 6 now passes the Pockels cell 8 arriving from the left-hand side, the polarization will no longer be rotated by 90° (i.e. into the plane of drawing), since the voltage $U_{\lambda/2}$ has already been switched off by the Pockels cell 8 (i.e., the voltage $U_{PC}$ at the Pockels cell 8 is 0 V again); since the polarization now has remained perpendicular to the plane of drawing, the laser pulse is coupled out by being reflected at the beam divider 5, cf. the arrow 7, instead of being allowed to pass to the pump unit 2. This amplified output pulse is illustrated in the third diagram line of FIG. 2, for the intensity I(7) of the pulse at outcoupling, cf. arrow 7 in FIG. 1.

In the system described the polarization within laser crystal 3 will always remain the same (i.e., according to the illustration of FIG. 1, in the drawing plane) so that any laser medium may be used without having to take into consideration a polarization-dependent amplification.

What is claimed is:
1. A laser arrangement to produce a plurality of amplified laser pulses, comprising:
   a common arm including a pump unit having a pumped laser crystal, the pump unit being configured to generate a plurality of laser pulses;

a first resonator arm including a passive mode-locking arrangement configured to passively mode-lock phases of the laser pulses;

a second resonator arm active in an amplifying phase and being free of components that introduce loses; and a switching arrangement arranged and operative to selectively connect the common arm to one of the resonator arms, and controllable to optically switch the laser pulses between the common arm and one of the resonator arms, wherein, during a pulse forming phase, the switching arrangement is controlled to switch the laser pulses between the common arm and the first resonator arm to mode-lock the phases of the laser pulses, and during an amplifying stage, the switching arrangement is controlled to switch the laser pulses between the common arm and the arm to amplify the mode-locked laser pulses to produce the amplified laser pulses.

2. The laser arrangement according to claim 1, wherein the switching arrangement includes a first polarization-sensitive beam divider optically coupled to the resonator arms, and further including a polarization rotating arrangement optically coupled to the beam divider and to the common arm, the polarization rotating arrangement being controllable to rotate a polarization of the laser pulses to switch the laser pulses of the common arm between one of the resonator arms.

3. The laser arrangement according to claim 2, wherein the polarization rotating arrangement is a Pockels cell.

4. The laser arrangement according to claim 2, wherein the common arm includes a second polarization-sensitive beam divider arranged in a path of the laser pulses to couple out the amplified laser pulses.

5. The laser arrangement according to claim 1, wherein the passive mode-locking arrangement includes a saturable absorber.

6. The laser arrangement according to claim 5, wherein the saturable absorber is a saturable semiconductor absorber.

7. The laser arrangement according to claim 5, wherein the saturable absorber is arranged to terminate the first resonator arm.

8. The laser arrangement according to claim 1, wherein the first resonator arm includes a linear loss element causing a high energy accumulation in the pumped laser crystal.

9. The laser arrangement according to claim 8, wherein the linear loss element includes a ¼ platelett.

10. The laser arrangement according to claim 1, wherein the pump unit is a continuous wave diode pump unit.

11. The laser arrangement according to claim 1, further comprising a pumping arrangement configured to pump the pumped laser crystal.

12. The laser arrangement according to claim 11, wherein the pumping arrangement includes one of a lamp-pump arrangement and a laser-pump arrangement.

* * * * *